United States Patent [19]
Itoh et al.

[11] Patent Number: 5,429,218
[45] Date of Patent: Jul. 4, 1995

[54] ROTATION TRANSMISSION DEVICE

[75] Inventors: Kenichiro Itoh, Shizuoka; Makoto Yasui, Iwata, both of Japan

[73] Assignee: NTN Corporation, Osaka, Japan

[21] Appl. No.: 255,937

[22] Filed: Jun. 7, 1994

[30] Foreign Application Priority Data

Jun. 8, 1993 [JP] Japan .................................. 5-137736
Jun. 8, 1993 [JP] Japan .................................. 5-137753

[51] Int. Cl.⁶ ........................ F16D 43/20; F16D 15/00
[52] U.S. Cl. .................................... 192/38; 192/45.1; 192/48.92; 188/134
[58] Field of Search ................ 192/38, 37, 45.1, 43.1, 192/48.92; 188/134; 464/140, 146

[56] References Cited

U.S. PATENT DOCUMENTS 5,131,285 7/1992 Weismann et al. ............... 192/38 X
5,269,399 12/1993 Ito et al. ............................ 192/45.1

FOREIGN PATENT DOCUMENTS 2255380 11/1992 United Kingdom .

*Primary Examiner*—Andrea L. Pitts
*Attorney, Agent, or Firm*—Nikaido, Marmelstein, Murray & Oram

[57] ABSTRACT

A mechanical device to be mounted on a four-wheel drive vehicle capable of transmitting driving force to the rear wheels while the vehicle is being accelerated and cutting off the transmission of driving force to the rear wheels while being braked. This device has an inner member to be coupled in series with a differential or a limited slip differential device, and an outer ring. On the opposite surfaces of the inner member and the outer ring are formed a cylindrical surface and a plurality of cam surfaces, between which are defined wedge-shaped spaces. A retainer is provided between the inner member and the outer ring. It is formed with pockets to receive rollers as engaging elements. A turning effort imparting device is coupled to the retainer through a one-way clutch. A torsion coil spring for producing turning effort is mounted between the retainer and the inner member. When the one-way clutch is switched on or off, the direction of turning effort applied to the retainer changes, so that the direction in which the rotation of the retainer delays with respect to the inner member is reversed. The rollers are thus kept in one of the two opposite engageable positions when the inner member is rotating in either direction.

6 Claims, 15 Drawing Sheets

# ROTATION TRANSMISSION DEVICE

BACKGROUND OF THE INVENTION

This invention relates to a rotation transmission device for transmitting driving force to the rear wheels of a four-wheel drive vehicle. More specifically, this device is used to selectively transmit the driving force when accelerating the vehicle and to cut off the driving force when braking.

A conventional four-wheel drive vehicle (hereinafter referred to as 4-WD), developed to increase the driving force when starting or accelerating and to improve the ability to keep moving, has a limited slip differential device such as a center differential or a viscous coupling between the front and rear axles. Such a limited slip differential device is not compatible with an antilock brake system (hereinafter referred to as ABS) for improving the braking force and driving stability, because such a combination tends to worsen the controllability by ABS and thus tends to cause simultaneous lockup of all four wheels or produce vibration of the vehicle body.

One conventional solution to this problem is shown in FIG. 25, in which on a rear wheel propeller shaft D of a 4-WD car, a one-way clutch G is provided between a viscous coupling F and a rear differential E to cut off the transmission of rotation while braking.

This arrangement utilizes the fact that, in an ordinary car, the front wheels tend to lock up before do the rear wheels when sharp brakes are applied. While the vehicle is moving forward at high speed, if sharp brakes are applied, the front wheels tend to lock up. But the one-way clutch G will begin idling instantly, thus cutting off the rotation restricting force between the front and rear wheels. This makes it possible for the ABS to detect the wheel speed difference between the front and rear wheels and perform antilock control.

But this arrangement has a problem in that when the vehicle is moving backward, that is, while the rear wheel propeller shaft D is rotating in reverse direction, the rear wheels cannot be driven because the one-way clutch G idles. Thus, no four-wheel drive is possible while the vehicle is moving backward.

If the vehicle is braked sharply while moving backward and the front wheels get locked, the one-way clutch G will engage, so that the rotation restricting force is produced by the differential limiting function of the viscous coupling F. This prevents the front and rear wheels from rotating at different speeds from each other. Thus, the ABS will lose its function because it is operative only if there is a rotational speed difference between wheels. Thus, there is a higher possibility of all four wheels getting locked simultaneously.

OBJECTS AND SUMMARY OF THE INVENTION

It is an object of this invention to provide a rotation transmission device which can transmit the driving force to all four wheels (4-WD mode) as necessary while being accelerated and which can automatically cut off the restricting force between the front and rear wheels (2-WD mode) while being braked, irrespective of whether the vehicle is moving forward or backward.

In order to attain this object, the rotation transmission device for use in a four-wheel drive vehicle comprises a driving member coupled to a rear wheel propeller shaft of the four-wheel drive vehicle, a driven member coupled to a rear wheel axle of the vehicle, one of the driving member and the driven member being mounted on the other so as to be rotatable relative to each other, a plurality of engaging elements disposed between the driving member and the driven member and adapted to engage the driving member and the driven member to interlock the members together when the driving member and the driven member rotate in either direction relative to each other, a retainer member mounted between the driving member and the driven member for keeping the engaging elements spaced apart from each other at predetermined intervals, the retainer member and the driving member being coupled together so as to rotate together with each other with a play in the circumferential direction left between the entire portion or a part of the retainer member and the driving member to allow them to rotate relative to each other, two turning effort imparting means coupled to the retainer member for imparting a turning effort to the retainer member from opposite directions, and a changeover means coupled to the retainer member for imparting the turning effort from one of the two turning effort imparting means to the retainer member while the driving member is rotating in one direction and imparting the turning effort from the other of the turning effort imparting means to the retainer member while the driving member is rotating in the opposite direction.

This rotation transmission device may be provided with a differential device or a limited slip differential device between the rear wheel propeller shaft and the driving member in series with the driving member.

The engaging elements may be either rollers or sprags. According to the shape of the engaging elements used, it is necessary to change the shapes of the driving member and the driven member and the structure of the retainer.

In this arrangement, while the vehicle is moving ahead, the rotation of the retainer is delayed with respect to the driving member due to the turning effort applied thereto. Thus, the engaging elements are brought to one engageable ready-to-engage position. When the vehicle is moved backward, the one-way clutch is actuated, thus switching the direction in which the rotation of the retainer is delayed. The engaging elements are thus brought to an opposite engageable ready-to-engage position.

While the vehicle is moving straight ahead or backward with the engaging elements in one of the two opposite engageable positions, the engaging elements are maintained in this ready-to-engage position because the front wheel and the rear wheel are rotating at the same speed. The vehicle is thus driven only on the front two wheels.

If the front wheels should slip in this state, the rear wheel propeller shaft begins to rotate faster than the rear wheels, so that the engaging elements will engage. Driving force is thus transmitted to the rear wheels and the vehicle is driven on all four wheels.

In contrast, if the vehicle is braked sharply and the front wheels tend to lock up, the rear wheel propeller shaft is decelerated sharply. Because the driving member and the driven member can slip relative to each other, the rotation of the rear wheels can exceed that of the rear wheel propeller shaft. Thus, no decelerating force is transmitted from the front wheels to the rear wheels. In other words, no restricting force is transmitted between the rear wheels and the front wheels. This makes it possible for the ABS to perform ABS control in exactly the same way as with a 2-WD car.

The rotation transmission device according to this invention has a mechanical clutch structure including the engaging elements. It is mounted on the rear wheel driving unit of a 4-WD vehicle in series with its differential or a limited slip differential device. With this arrangement, it becomes possible, irrespective of whether the vehicle is moving forward or backward, to transmit the driving torque to the rear wheels (4-WD mode) while being accelerated. If the front wheels slip and tend to lock up due to sharp braking or the like, the front wheels and rear wheels are allowed to rotate at different speeds as with a 2-WD vehicle because in this state, the mechanical clutch idles and thus no rotation restricting force is transmitted to the rear wheels. With this arrangement, it is possible to mount an ABS on a 4-WD vehicle as well as on a 2-WD one.

BRIEF DESCRIPTION OF THE DRAWINGS

Other features and objects of the present invention will become apparent from the following description made with reference to the accompanying drawings, in which.

DETAILED DESCRIPTION OF PREFERRED EMBODIMENTS

FIGS. 1-5 show the first embodiment of this invention.

As shown in the figures, the device of this embodiment has an outer ring 1 as a driven member, an inner member 2 as a driving member rotatably mounted in the outer ring 1 through a bearing 3, and an input ring 5 mounted to one end of the inner member 2 through a spline.

Figure 1:
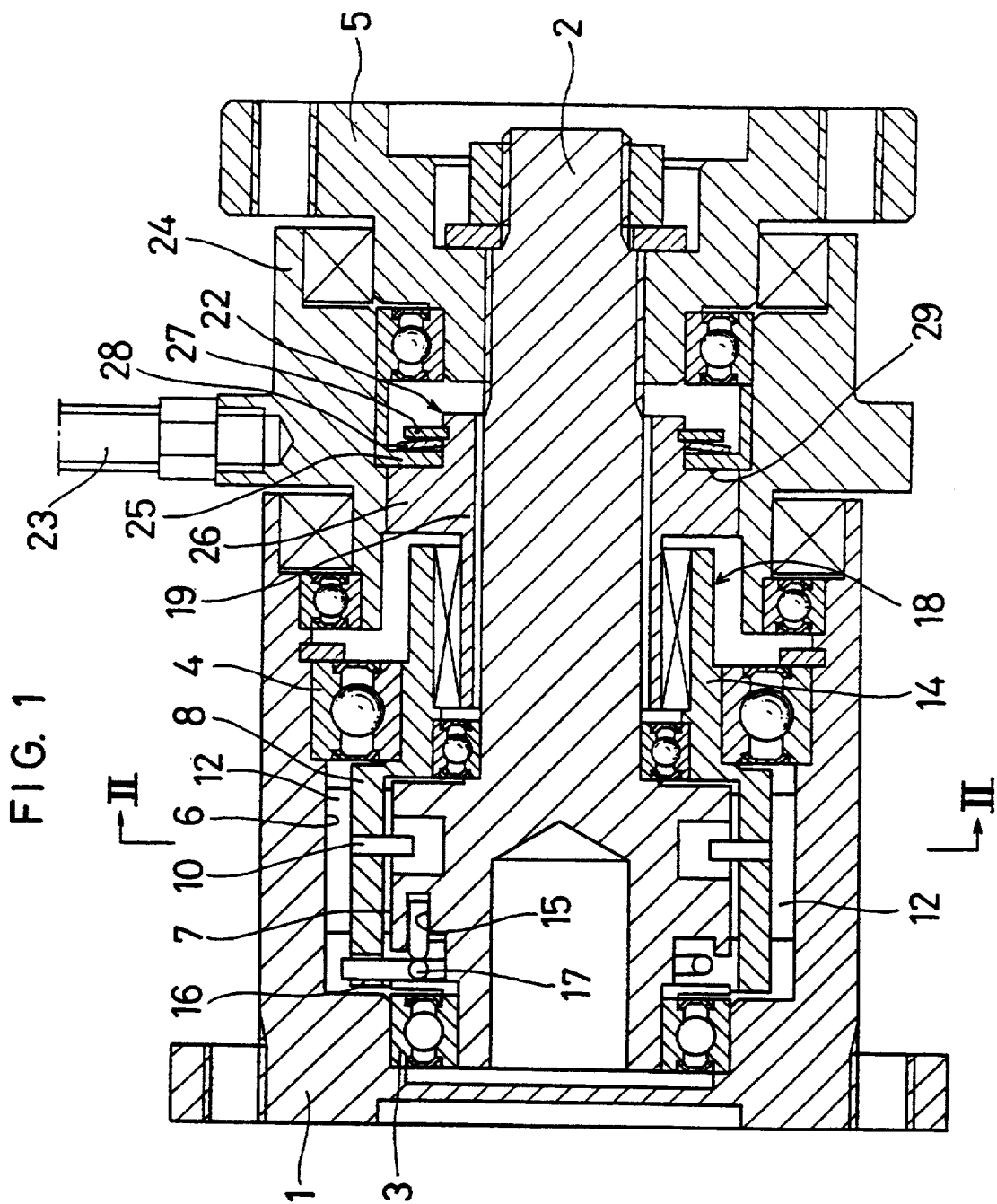
FIG. 1 is a sectional view of a first embodiment.
Figure 2:
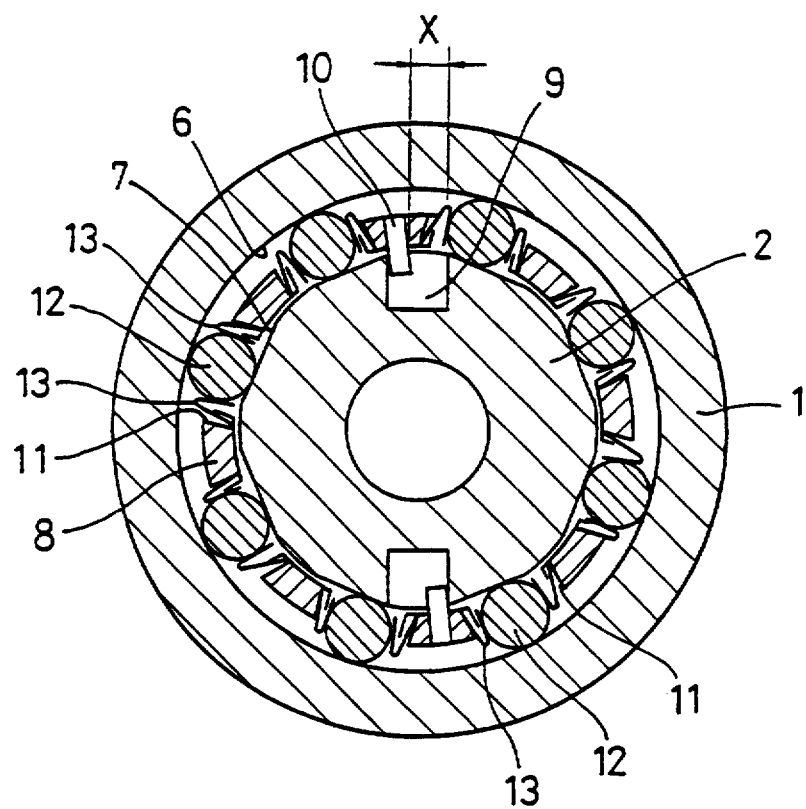
FIG. 2 is a sectional view taken along line II—II of FIG. 1.

A cylindrical surface 6 is formed on the inner periphery of the outer ring 1. The inner member 2 has a plurality of flat cam surfaces 7 on its outer periphery at regular intervals at a portion opposite to the cylindrical surface 6. Defined between each cam surface 7 and the cylindrical surface 6 of the outer ring 1 is a wedge-shaped space which narrows gradually toward both sides in the circumferential direction (FIG. 2).

An annular retainer 8 is provided between the outer ring 1 and the inner member 2 through a bearing 4. To the retainer 8 are coupled stopper pins 10 which extend into pin holes 9 formed in the peripheral wall of the inner member 2.

The retainer 8 is formed with circumferentially arranged pockets 11 as many as the cam surfaces 7. Each pocket 11 accommodates a roller 12 as an engaging element and springs 13. That is, one roller 12 is provided on each cam surface 7 of the inner member 2. When the rollers 12 are moved by a predetermined distance circumferentially by the retainer 8, they will engage the cam surfaces 7 and the cylindrical surface 6, thus coupling the outer ring 1 and the inner member 2 together. The springs 13 are disposed between the rollers 12 and the side walls of the pockets 11 to urge the rollers 12 from both sides to keep them in neutral positions where they are not in engagement with either the cylindrical surface 6 or cam surfaces 7. When the retainer 8 is moved by a predetermined distance circumferentially, only the springs 13 on one side of the rollers 12 act thereon, thereby urging them against the engaging surfaces.

A one-way clutch 18 (described later) is press-fitted in one end of the retainer 8. The retainer 8 is formed with a cutout 16 in the deeper end thereof. A torsion coil spring 17 is mounted between the cutout 16 and a spring seat 15 of the inner member 2 with its ends fixed to the retainer 8 and the inner member 2. The retainer 8 is biased by the coil spring 17 in such a direction as to rotate relative to the inner member 2.

On the other hand, the one-way clutch 18, which is press-fitted in the end of the retainer 8, is coupled to a turning effort imparting means 22 through an inner ring 19.

The turning effort imparting means 22 comprises a housing 24 coupled to the vehicle body through a coupling rod 23 and rotatably supported through bearings so as to be rotatable relative to the outer ring 1 and the inner member 2, a friction pad 25 press-fitted in the housing 24, a flange 26 provided on the inner ring 19 and kept in frictional contact with the friction pad 25, a snap ring 27, and a disc spring 28 disposed between the friction pad 25 and the snap ring 27. The friction pad 25 is pressed against the flange 26 by the spring force of the disc spring 28, so that a drag torque is produced at a frictional contact portion 29 between the pad 25 and the flange 26. The drag torque acts on and delays the rotation of the inner ring 19 which otherwise tends to rotate together with the retainer 8. The turning effort produced at the frictional contact portion 29 is set to be larger than the rotational torque applied to the retainer 8 by the torsion coil spring 17.

Figure 3:
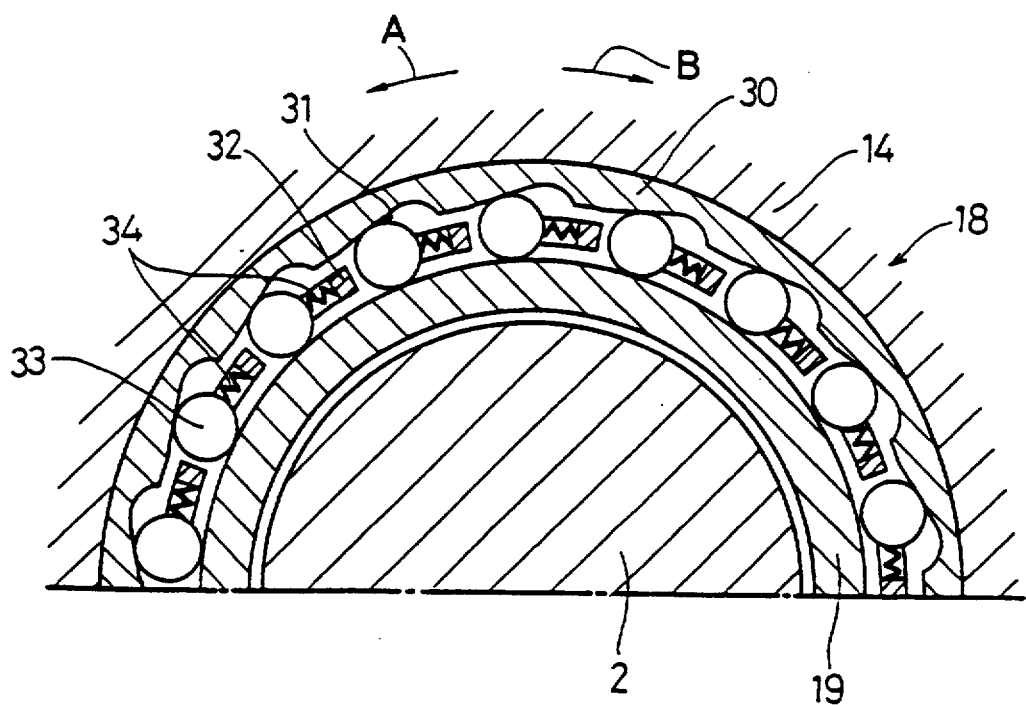
FIG. 3 is a sectional view of the one-way clutch of the same.

Referring to FIG. 3, the one-way clutch 18 comprises a cam ring 30 press-fitted in an extended end 14 of the retainer 8 and having on inner periphery thereof a plurality of inclined cam surfaces 31 arranged at predetermined angular intervals, small rollers 33 disposed between the cam surfaces 31 and the inner ring 19 and held in position by a retainer 32, and springs 34 also provided between the cam surfaces 31 and the inner ring 19 for urging the rollers 33 against the cam surfaces 31 and the inner ring 19.

In this arrangement, when the retainer 8 is rotated in the direction of arrow B of FIG. 3, the one-way clutch 18, press-fitted in the retainer 8, will be set, thus coupling the inner ring 19 and the retainer 8 together. The drag torque produced at the frictional contact portion 29 of the turning effort imparting means 22 now acts on the retainer 8 in such a direction as to resist the rotation of the retainer 8 and thus the rotation of the retainer 8 is delayed with respect to the inner member 2.

In contrast, when the retainer 8 is rotated in the direction of arrow A of FIG. 3, the one-way clutch 18 will disengage, thus idling. In this state, the resistance of the turning effort imparting means 22 is not transmitted to the retainer 8.

As shown in FIG. 2, the stopper pins 10, coupled to the retainer 8, loosely fit in the pin holes 9 formed in the peripheral surface of the inner member 2 with a gap X formed in the direction of rotation. The angle of lag of the retainer 8 with respect to the inner member 2 is determined by the size of the gaps X in the rotational direction and their size is set to be larger than the distance by which the rollers 12 move from one engaged position to the other engaged position where they engage the cam surfaces 7 and the cylindrical surface 6.

Figure 6:
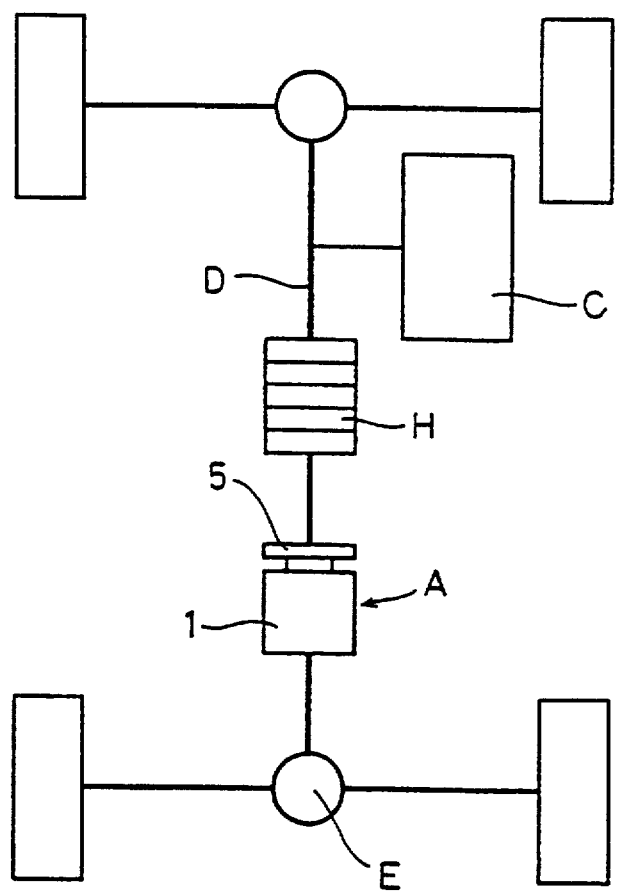
FIG. 6 is a schematic view showing the drive unit of a vehicle.

A rotation transmission device of this embodiment is mounted as a rotation transmission device A on the rear wheel drive path of a four-wheel drive vehicle of the type as shown in FIG. 6 in which the front wheels are the main driven wheels.

Namely, to the rear wheel propeller shaft D, which extends from a transfer C, are coupled a fluid coupling H such as a viscous coupling as the limited slip differential device and the input ring 5 of the inner member 2 in series. The outer ring 1 is coupled to the rear differential E.

This device A is mounted such that while the vehicle is moving forward, the inner member 2 rotates in the direction of arrow A of FIG. 3 (the one-way clutch 18 is disengaged in this state) and, while it is moving backward, the inner member 2 rotates in the direction of arrow B (one-way clutch 18 is set). The coil spring 17 imparts to the retainer 8 a turning effort in the opposite direction to the direction of arrow A in FIG. 3.

When the vehicle begins to move forward in this state (shown in FIGS. 2 and 3), the inner member 2 begins to rotate driven by the rear propeller shaft D, while the retainer 8, biased by the coil spring 17, begins to rotate after the inner member 2 has moved by a distance equal to the size of the rotational-direction gaps X between the stopper pins 10 and the pin holes 9. When the retainer 8 rotates in this direction, the one-way clutch 18 will idle. In this state, since the inner ring 19 and the disc spring 28 do not rotate, no turning effort is produced at the contact portion with the housing 24.

Figure 4:
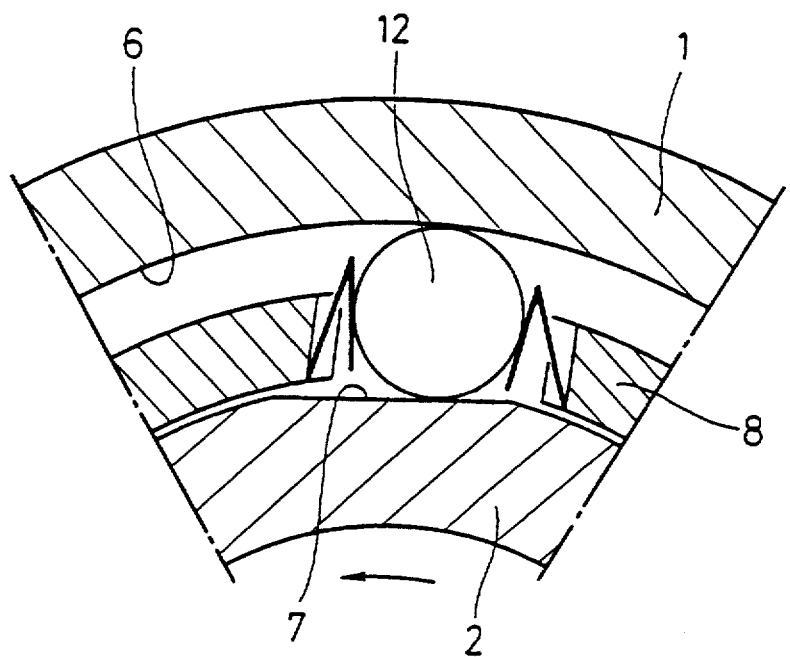
FIG. 4 is a sectional view showing one state of the rollers of the same.

In this state, the retainer 8, urged by the torsion coil spring 17, keeps its phase slightly behind the inner member 2 as shown in FIG. 4. The rollers 12 are thus kept in a ready-to-engage position.

In contrast to the above, when the vehicle is moved backward, the inner member 2 begins to rotate first. The retainer 8, urged by the torsion coil spring 17, tends to rotate together with the inner member 2. But when the retainer 8 rotates in this direction, the one-way clutch will lock, so that the inner ring 19, disc spring 28 and flange 26 are rotated together with the retainer 8.

Figure 5:
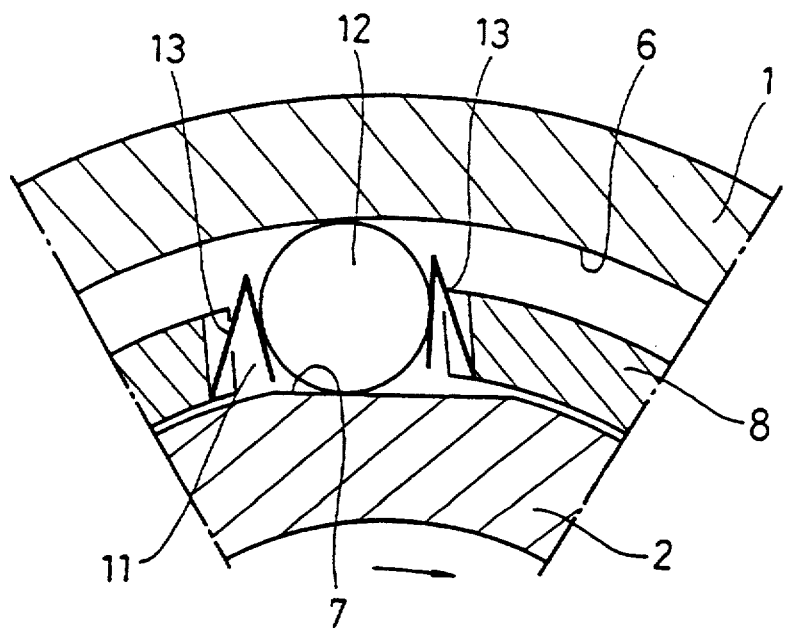
FIG. 5 is a sectional view showing another state of the rollers opposite to the state of FIG. 4.

In this case, since the turning effort produced between the flange 26 and the friction pad 25 by the spring force of the disc spring 28 is set to be larger than the turning effort produced by the torsion coil spring 17, the retainer 8 is decelerated by the former turning effort and falls behind the inner member 2 as shown in FIG. 5. The rollers 12 are thus brought to an engageable position. Thereafter, the disc spring 28 and flange 26 rotate keeping the position of FIG. 5, in which they are in frictional contact with the friction pad 25 and thus turning effort is produced therebetween.

Now let us consider the operation of the device A in an actual driving situation. While the vehicle is moving straight ahead or backward in a normal state, the front wheels, rear wheels and rear wheel propeller shaft D rotate at the same speed because the rear wheels are rotating in unison with the front wheels. The rollers 12 are kept in the ready-to-engage position. The vehicle is thus driven only on the front two wheels.

When the vehicle is steered and turned and thus the front wheels begin to rotate faster than the rear wheels, the rotation of the inner member 2 increases. This causes the rollers 12 to engage the cylindrical surface 6 and the cam surfaces 7, thus interlocking the outer ring 1 and the inner member 2. In this state, due to the differential limiting function of the fluid coupling H mounted on the rear wheel propeller shaft D, the front wheels are allowed to keep rotating faster than the rear wheels, while transmitting driving force to the rear wheels. The vehicle is thus driven on all four wheels while turning.

On the other hand, if the front wheels should slip while travelling, the rear wheel propeller shaft D begins to rotate faster than the rear wheels (outer ring). This causes the rollers 12 to engage the cylindrical surface 6 and the cam surfaces 7, thus interlocking the outer ring 1 and the inner member 2. Thus, if the front wheels slip, the driving mode switches to four-wheel drive.

In contrast, if sharp brakes are applied on a road having a low frictional coefficient, the front wheels are more likely to lock than the rear wheels. If the front wheels should lock up, the rear wheel propeller shaft (inner member) is decelerated sharply. But since the outer ring 1 idles with respect to the inner member 2 in this state, the deceleration due to the front wheel lockup is not transmitted to the rear wheels. In other words, there exists no restricting force between the rear wheels, which are not locked, and the front wheels which are tending to lock. Thus, the ABS controller can detect the difference in rotational speed between the front and rear wheels and perform ABS control in exactly the same way as with a 2-WD vehicle.

Figure 7:
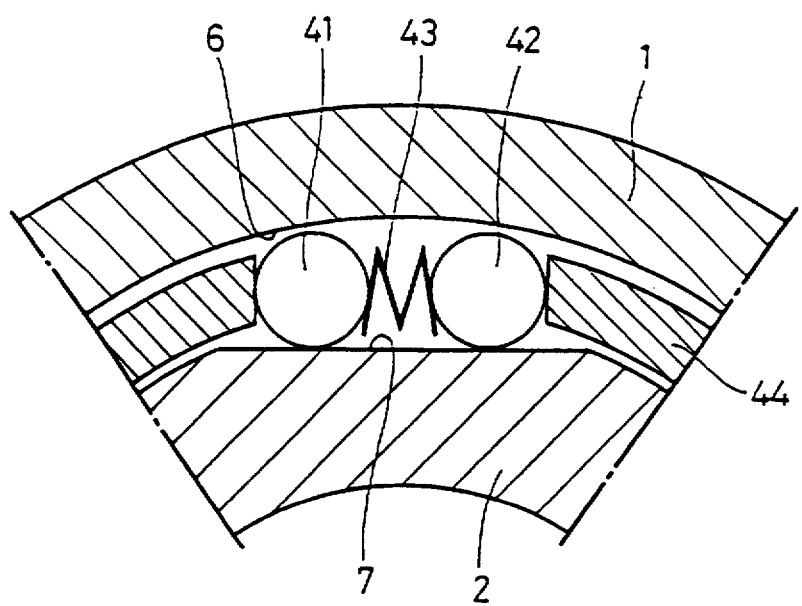
FIG. 7 is a sectional view showing one state of the rollers in a second embodiment.
Figure 8:
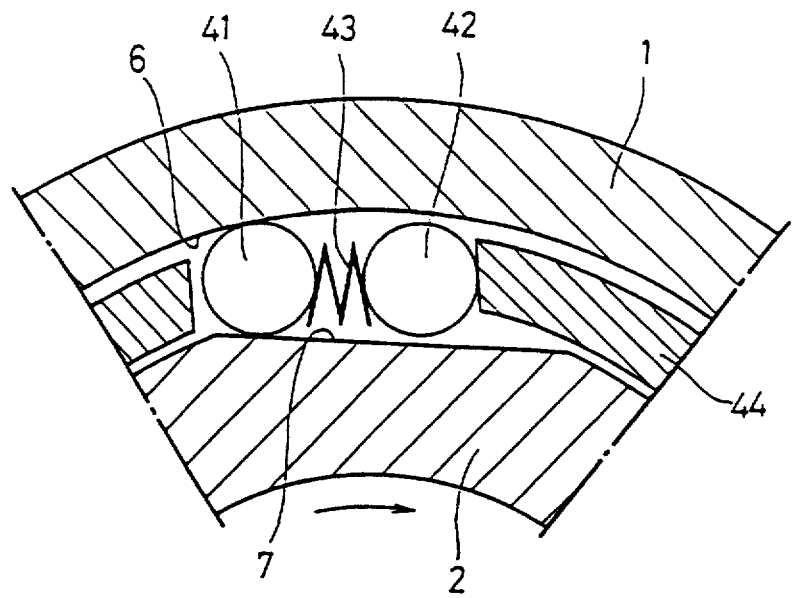
FIG. 8 is a sectional view showing another state of the same.

FIGS. 7 and 8 show the second embodiment, which is the same as the first embodiment except that two rollers 41 and 42 are provided between each cam surface 7 and the cylindrical surface 6 and a spring 43 is disposed between the rollers 41 and 42 to bias them away from each other.

In this arrangement, when the inner member 2 rotates in the direction of arrow in FIG. 8, a retainer 44 is decelerated. Thus, the other roller 41 is biased by the retainer through the spring 43 into an engaging position.

Figure 9:
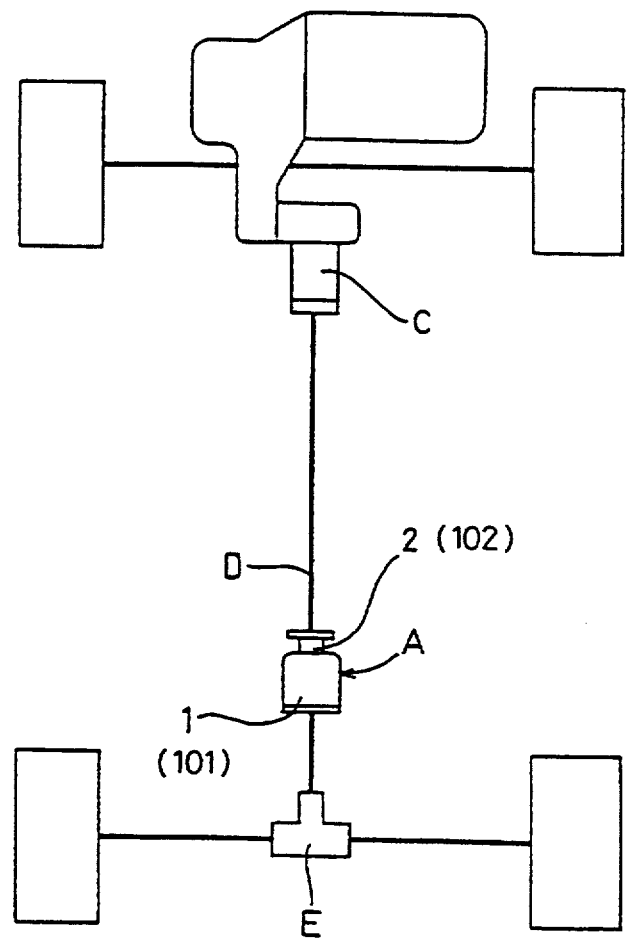
FIG. 9 is a view of the same mounted on the drive unit of a different vehicle.

As shown in FIG. 9, rotation transmission devices A of the first and second embodiments can be mounted on the drive unit of a four-wheel drive vehicle having no fluid coupling H (shown in FIG. 6) by directly coupling the inner member 2 to the rear wheel propeller shaft D extending from the transfer C and coupling the outer ring 1 to the rear differential E.

In this case, the ratio of rotation (gear ratio) of the transmission or transfer C or between the front and rear differentials is set so that the rotational speed of the rear wheel propeller shaft D will be lower than that of the front wheels by a predetermined amount (about 10%).

With this direct-coupled arrangement, when the vehicle is turned with a certain steering angle, the rotational speed of the front wheels exceeds that of the rear wheels. But since such a difference in rotational speed between the front and rear wheels is absorbed by the preset speed difference of about 10% between the input and output members, the rotation of the input member is prevented from exceeding the rotation of the output side. Thus, the outer ring 1 will idle while the vehicle is turning. Thus, the front and rear wheels are not connected directly, so that no braking phenomenon will occur while turning a tight corner.

Figure 10:
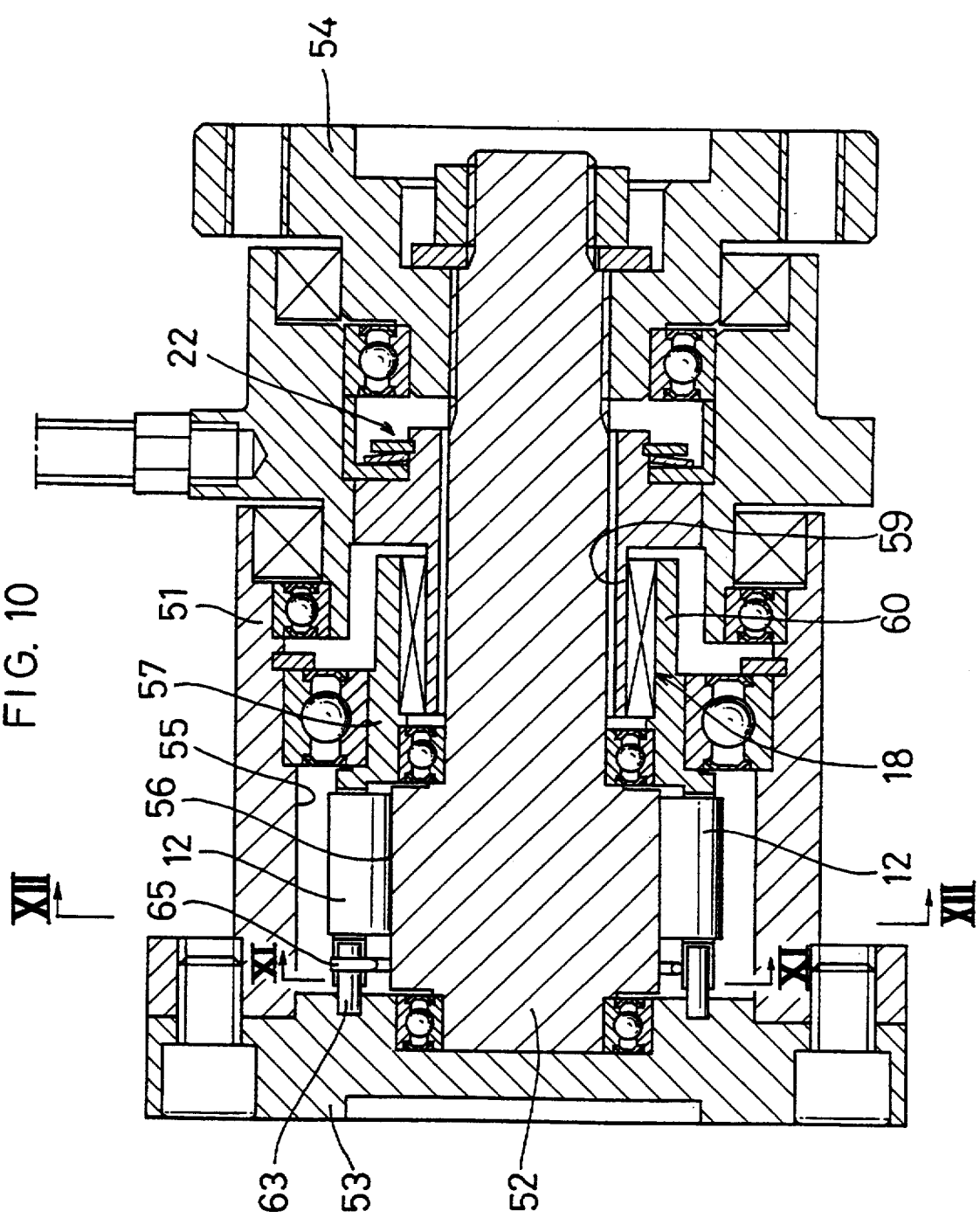
FIG. 10 is a vertical sectional front view of a third embodiment.
Figure 11:
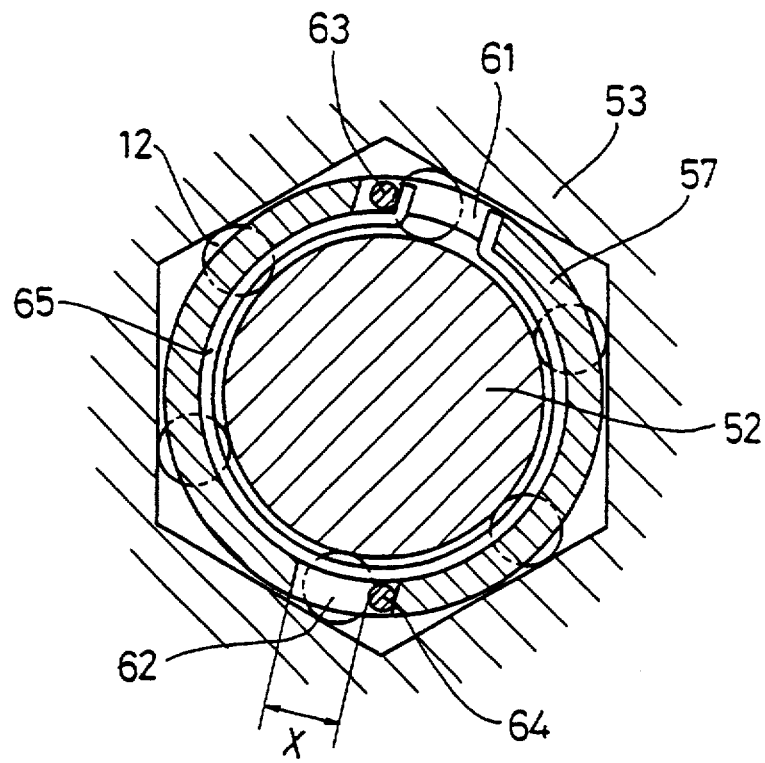
FIG. 11 is a sectional view taken along line XI—XI of FIG. 10.

FIGS. 10–13 show the third embodiment in which in contrast to the first embodiment, the outer ring is the input member and the inner member is the output member. Thus, as shown in FIG. 10, an outer ring 51 is provided with an input flange 53 at one end thereof, while an inner member 52 carries an output ring 54 on one end.

Figure 12:
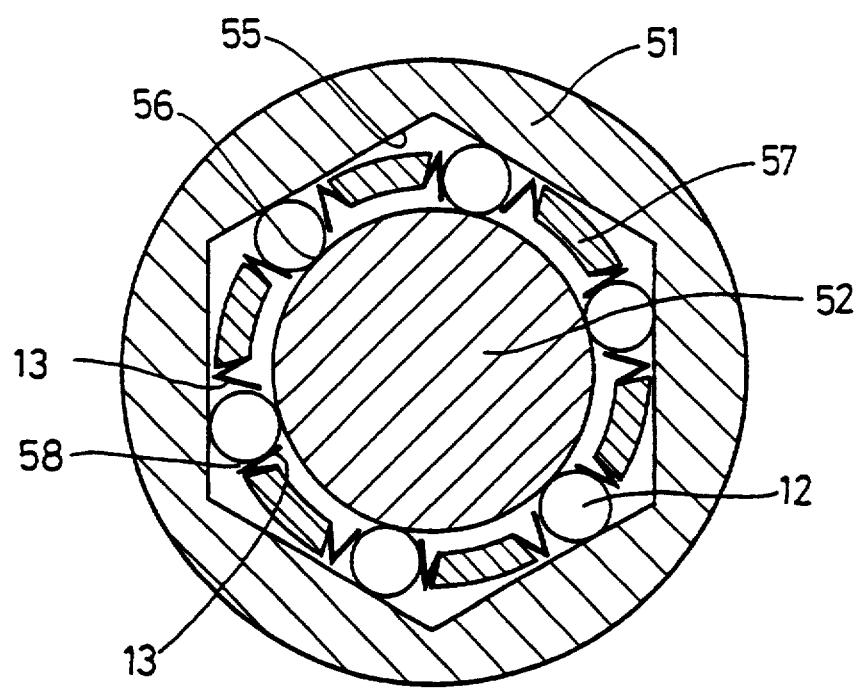
FIG. 12 is a sectional view taken along line XII—XII of FIG. 10.

As shown in FIG. 12, the outer ring 51 has on its inner periphery a plurality of cam surfaces 55 having a polygonal section as a whole. The inner member 52 is formed with a cylindrical surface 56 on its outer periphery at a portion opposite to the cam surfaces 55. An annular retainer 57 is mounted between the cylindrical surface 56 and the cam surfaces 55 so as to be rotatable relative to the outer ring 51. It is formed with pockets 58 in its peripheral surface, each pocket accommodating a roller 12 adapted to engage the cam surfaces 55 and the cylindrical surface 56 with rotation in either direction, and springs 13 for keeping the roller 12 in its neutral position.

On the other hand, the retainer 57 has its rear end rotatably supported between the outer ring 51 and the inner member 52 and has an extension that serves as an outer ring 60 of a one-way clutch 18 to which is coupled a turning effort imparting means 22.

In the front end of the retainer 57 are formed diametrically opposite cutouts 61 and 62 to receive fixed pins 63, 64, respectively, which are press-fitted in the input flange 53 of the outer ring 51. A C-shaped ring spring 65 is mounted with its both ends in engagement with the end wall of one of the cutouts 61 and one of the fixed pins 63. The retainer 57 is urged by the ring spring 65 in the direction opposite to the direction in which the one-way clutch 18 rotates to disengage.

The other fixed pin 64, which is not in engagement with the ring spring 65, fits loosely in the cutout with a rotational-direction gap X. The gap X is set to be larger than the distance by which the rollers move from one engaged position to the other engaging position.

Figure 13:
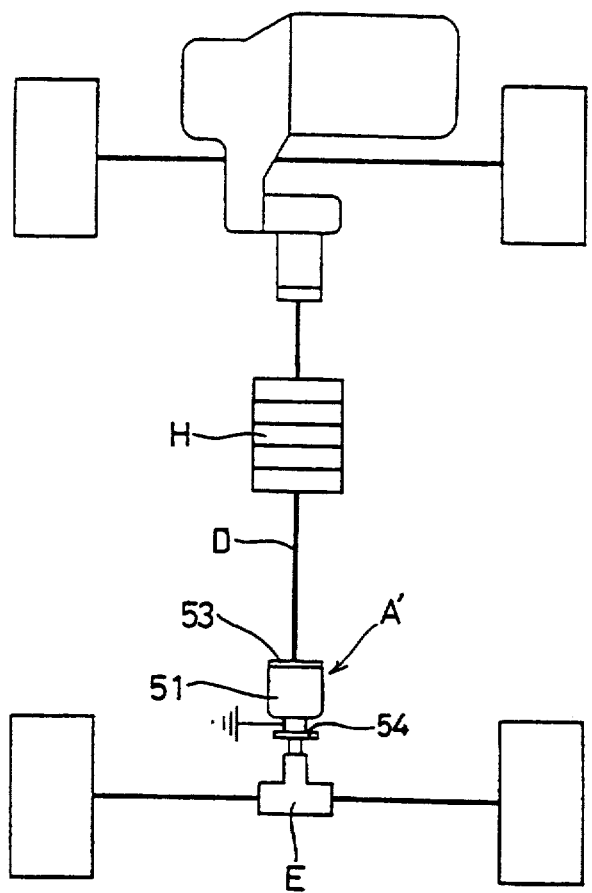
FIG. 13 is a view showing the same mounted on the drive unit of a vehicle.

The rotation transmission device A' of the third embodiment is mounted on the driving unit of a vehicle shown in FIG. 13 by coupling the input flange 53 of the outer ring 51 to the rear wheel propeller shaft D in series with the fluid coupling H and coupling the output ring 54 of the inner member 52 to the rear differential E (in this case, the transmission device A' is mounted in the opposite position to the device A of FIG. 6).

In this arrangement, when the retainer 57 and the one-way clutch 18 are rotated in one direction through the outer ring 51 and the fixed pins 63, 64, the one-way clutch 18 will get locked to the inner ring 59, so that the turning effort of the turning effort imparting means 22 acts on the retainer 57. Thus, the retainer 57 is decelerated with respect to the outer ring 51.

In contrast, when the outer ring 51 and the retainer 57 are rotated in the opposite direction to the above, the one-way clutch 18 will disengage, disconnecting the retainer 57 from the turning effort imparting means 22. The retainer 57 is now urged by the ring spring 65 in the opposite direction to the above, so that the rotational speed of the retainer 57 drops below that of the outer ring 51.

Figure 14:
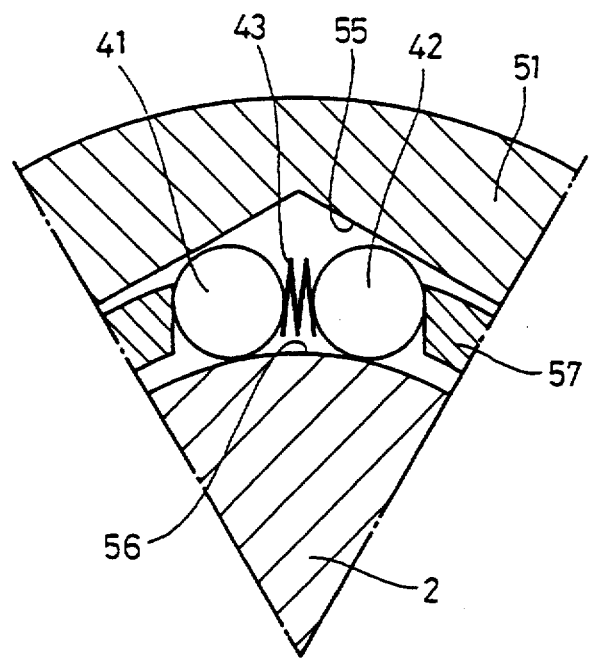
FIG. 14 is a sectional view of a modified example of the third embodiment.

In the arrangement of the third embodiment, as shown in FIG. 14, two rollers 41, 42 and the spring 43 may be mounted between each cam surface 55 and the cylindrical surface 56 so that one of each pair of rollers 41, 42 will be brought into engagement with the cam surfaces 55 and the cylindrical surface 56.

Figure 15:
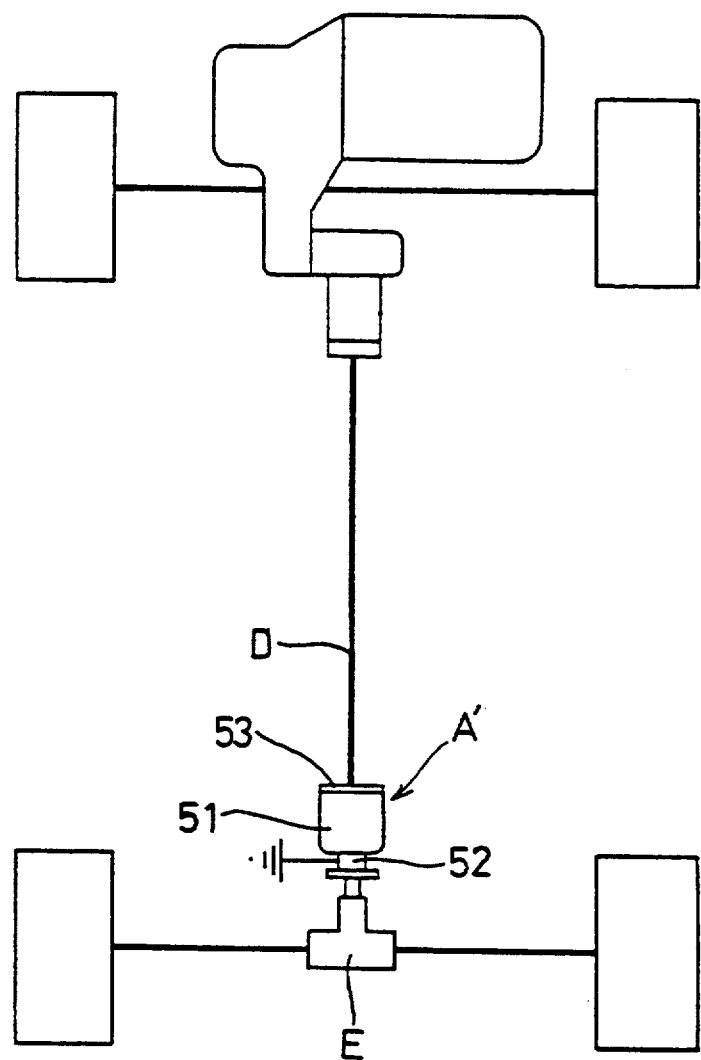
FIG. 15 is a view showing the same mounted on the drive unit of a different vehicle.

The rotation transmission device A' of the third embodiment can also be mounted on the driving unit of a vehicle having no fluid coupling H by coupling the input flange 53 of the outer ring 51 directly to the rear wheel propeller shaft D as shown in FIG. 15.

In this case, too, as in the above-described arrangement, the driving unit is so set that rear wheel propeller shaft will rotate at a speed slower to a predetermined amount (about 10%) than the front wheels to avoid braking phenomenon while turning a tight corner.

FIGS. 16 through 22 show the fourth embodiment in which in place of the rollers, sprags are used as engaging elements.

Figure 17:
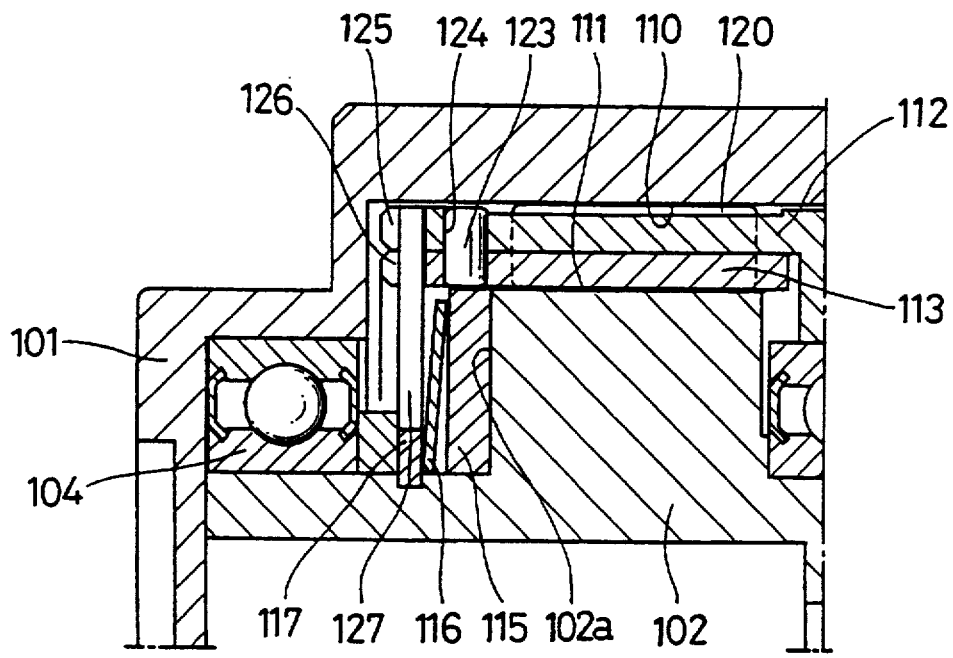
FIG. 17 is a partial enlarged sectional view of the same.
Figure 18:
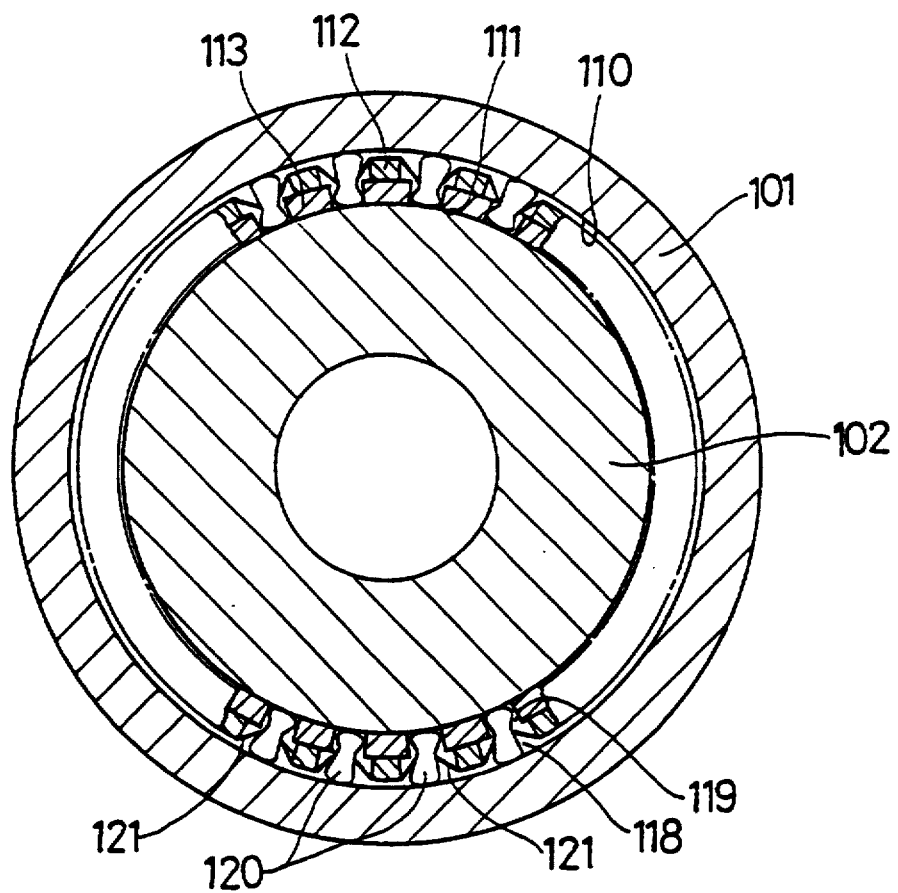
FIG. 18 is a sectional view taken along line XVIII-—XVIII of FIG. 16.
Figure 16:
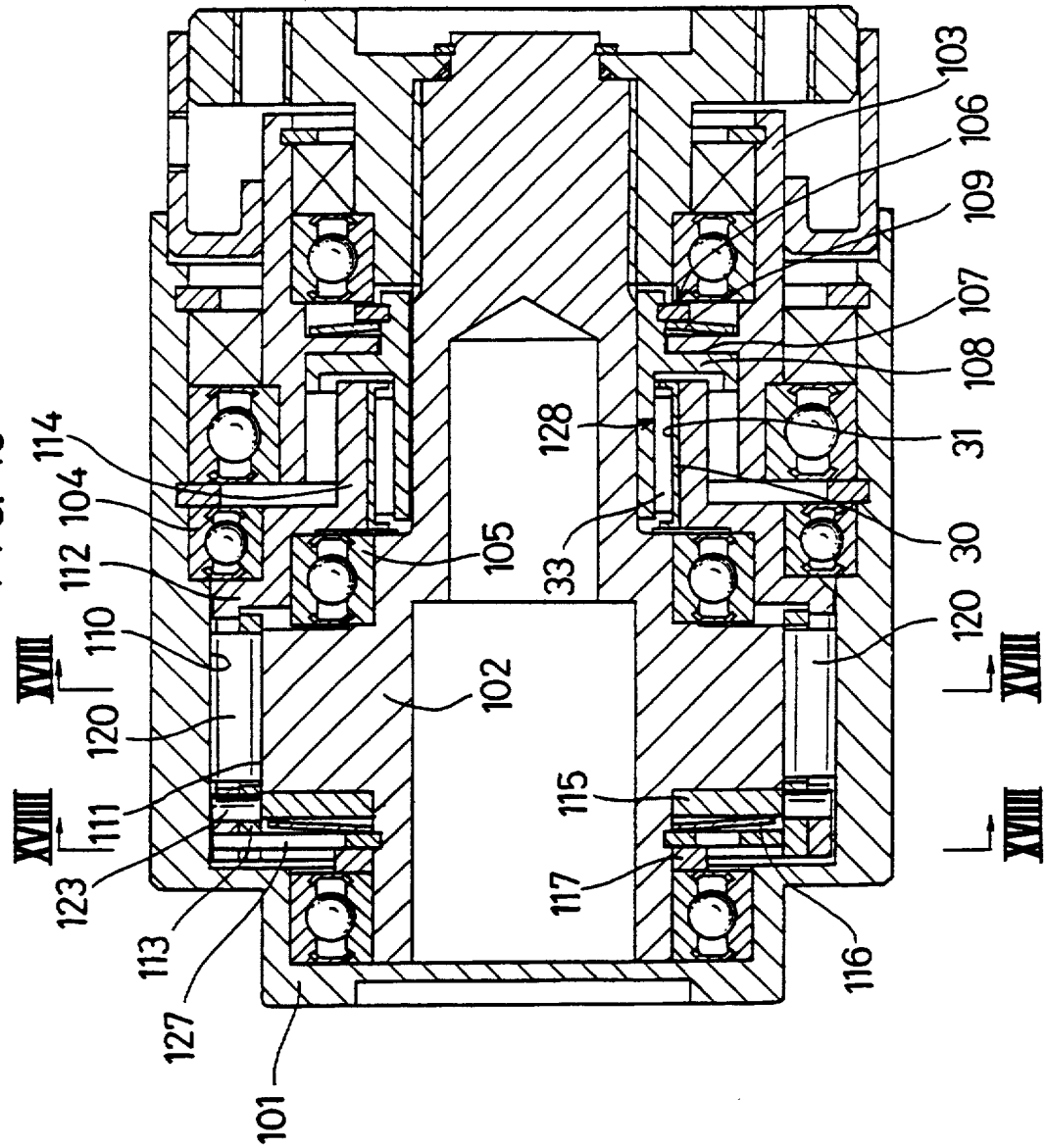
FIG. 16 is a vertical sectional front view of a fourth embodiment.

Namely, as shown in FIGS. 16 to 18, concentric cylindrical surfaces 110 and 111 are formed on the inner periphery of an outer ring 101 and the outer periphery of an inner member 102, respectively, so as to be opposite to each other. A first retainer 112 and a second retainer 113 having different diameters from each other are mounted between the cylindrical surfaces 110 and 111.

The first retainer 112 is integrally provided at its rear end with an extension arm 114 that extends between and guided by bearings 104, 105 so as to be rotatable relative to the outer ring 101 and inner member 102.

The second retainer 113 is provided at its front end with a bent portion 115 bent radially inwards and kept in sliding contact with an end face 102a of the inner member 102. A crimp spring 116 in the form of a disc spring is mounted between the bent portion 115 and a snap ring 117. The bent portion 115 is biased by the crimp spring 116 against the end face 102a of the inner member 102. The second retainer 113 is pressed against the inner member 102 by the friction produced at the contact portion between the bent portion 115 and the inner member 102.

Figure 21:
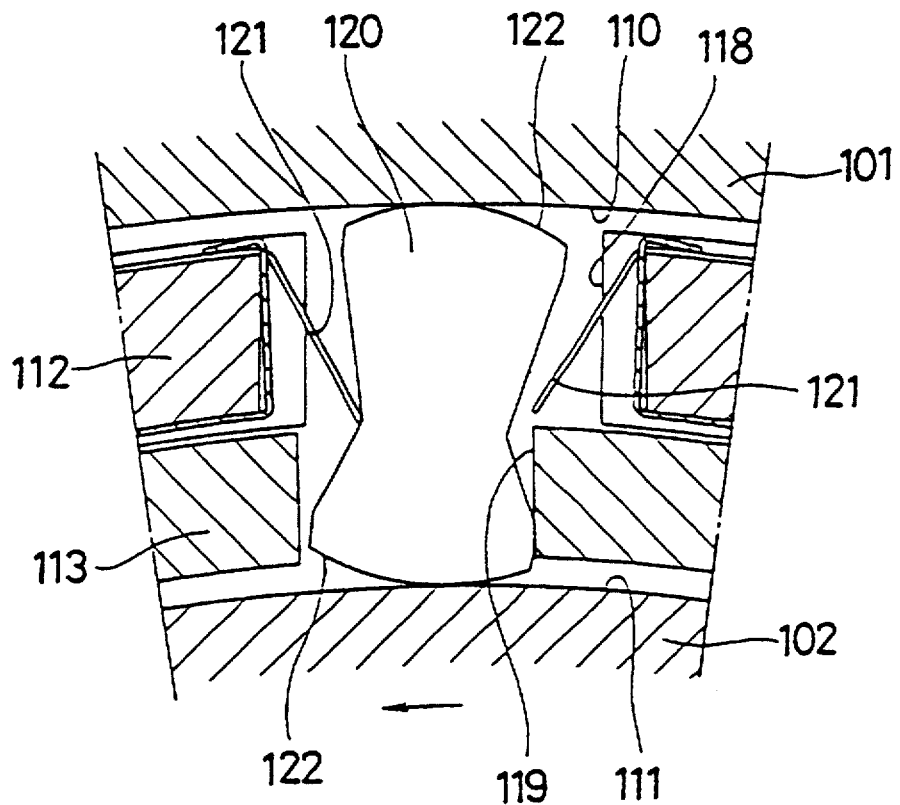
FIG. 21 is a sectional view showing the operational state of the sprags when the vehicle is moving ahead.
Figure 22:
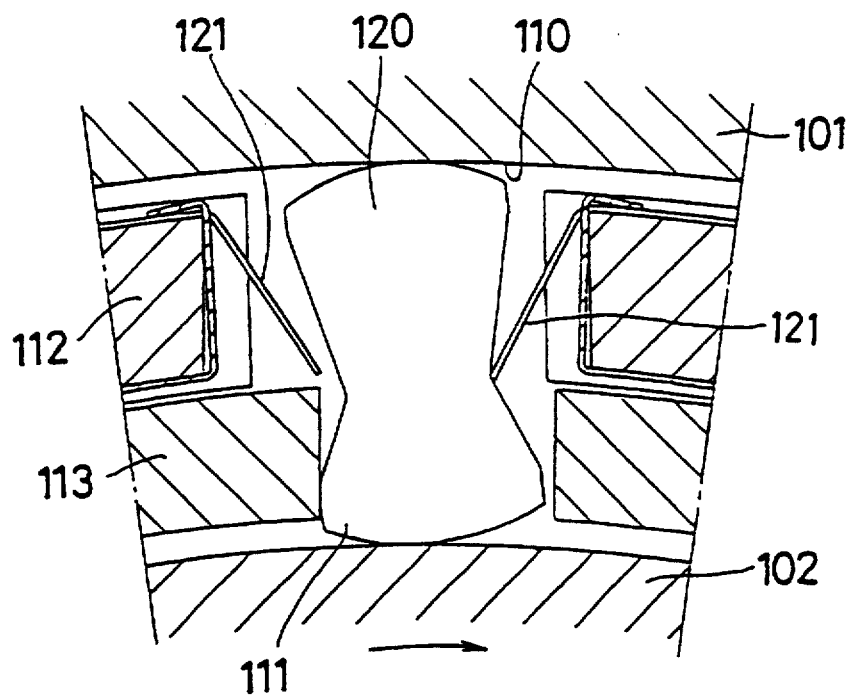
FIG. 22 is a sectional view showing the same when the vehicle is moving backward.

As shown in FIGS. 18 and 21, the first retainer 112 and the second retainer 113 have in their respective peripheral surfaces a plurality of pockets 118 and 119, respectively, that are arranged opposite to each other. In each pair of opposite pockets 118 and 119 are mounted a sprag 120 as an engaging element and springs 121 for retaining the sprag.

Each sprag 120 has outer and inner arcuate peripheral surfaces 122 whose centers of curvature are located on the central axis of the sprag. When they are inclined in either direction by a predetermined angle, they engage both cylindrical surfaces 110 and 111, thus interlocking the outer ring 101 and the inner member 102 together. The springs 121 have one end thereof supported on the first retainer 112 to urge the sprags 120 from both sides to keep them in engagement with the cylindrical surfaces 110 and 111.

Figure 19:
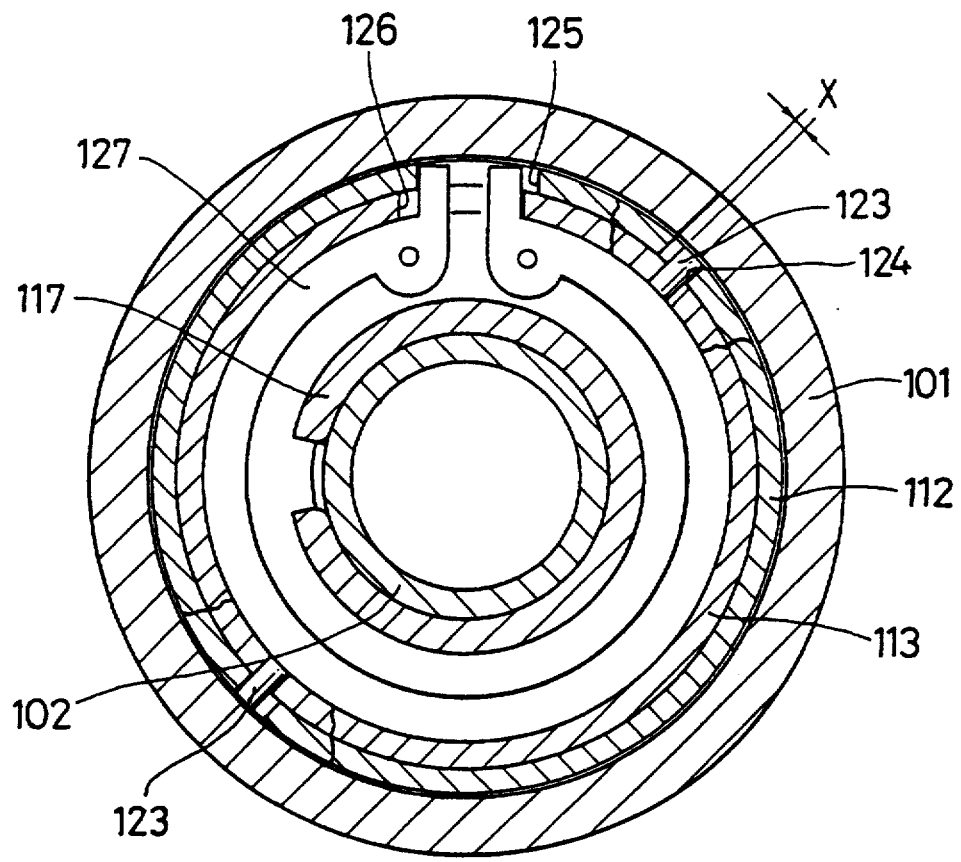
FIG. 19 is a sectional view taken along line XIX-—XIX of FIG. 16.
Figure 20:
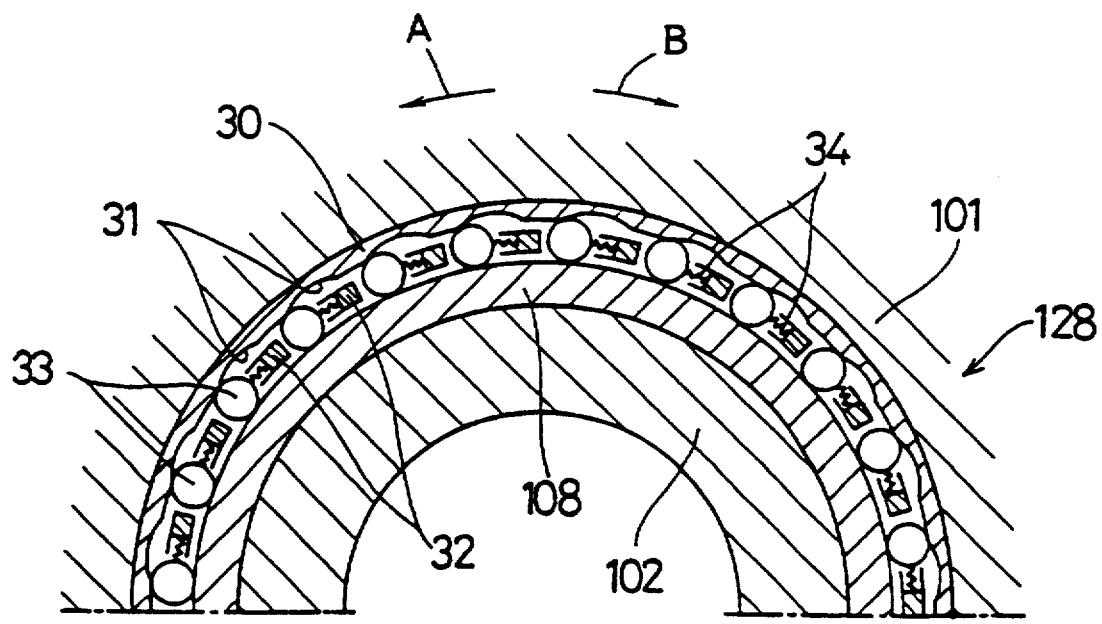
FIG. 20 is a sectional view of the one-way clutch of the same.

As shown in FIGS. 17 and 19, stopper pins 123 are fixed to the front end of the second retainer 113. They fit in square holes 124 formed in the first retainer 112. A gap X is formed in the direction of rotation between the wall of the square holes 124 and the pins 123.

As shown in FIG. 19, the first retainer 112 and second retainer 113 have slits 125 and 126 that extend diametrically therethrough. A C-shaped switch spring 127 is mounted in a circumferentially compressed state and has its both ends engaged in the slits 125, 126. Namely, its one end is pressed against the first retainer 112 and the other end against the second retainer 113 to urge the retainers 112, 113 in circumferential directions. Thus, the first retainer 112, urged by the spring 127 in the direction opposite to the direction in which it is urged when the one-way clutch has engaged, rotates until the walls of the square holes 124 abut the stopper pins 123 press-fitted in the second retainer 113.

The rotational-direction gaps X around the stopper pins 123 in the square holes 124 are set to a size that the sprags 120 are inclinable to ready-to-engage positions at which they are ready to engage the engaging surfaces 110 and 111. The retainers 112 and 113 and sprags 120 are rotated in one direction by the switch spring 127 to forward-travel ready-to-engage positions.

As for a one-way clutch 128 for changing over the direction of the turning effort applied to the first retainer 112 and a turning effort imparting means 106 coupled to the one-way clutch 128, they are structurally the same as the corresponding elements of the first embodiment. Thus, their description is omitted with their parts designated by the same numerals as those of the first embodiment.

The turning effort produced at a frictional contact portion 107 of the turning effort imparting means 106 is set to be larger than the turning effort exerted on the first retainer 112 by the switch spring 127.

The rotation transmission device of this embodiment is mounted on a vehicle as shown in FIG. 6 or 9. Namely, an input ring of the inner member 102 is coupled to the rear wheel propeller shaft D extending from the transfer, while the outer ring 101 is coupled to the rear differential E. In the same way as in the first embodiment, it has to be mounted so that while the vehicle is moving forward, the inner member will rotate in the same direction as the direction in which the one-way clutch 128 rotates to disengage, and while the vehicle is moving backward, it will rotate in the same direction as the direction in which the one-way clutch rotates to get locked.

When the vehicle begins to move forward in this state, the inner member 102 and the second retainer 113 begin to rotate, driven by the rear wheel propeller shaft D. The first retainer 112, biased by the switch spring 127, begins to rotate behind the inner member 102 and second retainer 113 by a distance equal to the size of the rotational-direction gaps X around the stopper pins 123 in the square holes 124. When the first retainer 112 rotates in this direction, the one-way clutch 128 idles, so that an inner ring 108 and a disc spring 109 remain stationary and no turning effort is produced between them and the support case 103. In this state, the first retainer 112, biased by the switch spring 127, keeps its position where it delays in phase with respect to the inner member 102 and second retainer 113, thus holding the sprags in their engageable ready-to-engage positions.

In contrast to the above, when the vehicle is moved backward, the inner member and the second retainer 113 begin to rotate. Since the first retainer 112 is biased by the switch spring 123, it tends to rotate together with the inner member 102.

In this case, since the one-way clutch 128 is locked, the first retainer 112 is decelerated by the turning effort produced by the disc spring 109 and falls behind the inner member 102 and the second retainer 113. The sprags 120 are thus moved to engageable positions. Thereafter, the inner ring 108 and the support case 103 will rotate while producing turning effort therebetween, so that the sprags are maintained in the position shown in FIG. 22.

In this state, if the rear propeller shaft begins to rotate faster than the rear wheels (outer ring) as a result of e.g. slip of front wheels, the sprags 120 will engage both cylindrical surfaces, thus interlocking the outer ring 101 and the inner member 102. Thus, the vehicle drive mode switches to four-wheel drive if the front wheels slip.

If, in this state, high torque is applied to the sprags 120, the sprags and the engaging surfaces 110, 111 will be elastically deformed, so that a large force acts on the second retainer 113 due to interference with the sprags.

If this force exceeds the frictional force produced at the contact portion between the bent portion 115 of the second retainer 113 and the inner member 102 by the biasing force of the crimp spring 116, the second retainer 113 will begin to slip with respect to the inner member 102 and rotate a distance corresponding to the amount of interference with the sprags 120. Thus, the force exerted on the second retainer 113 is relaxed, so that no undue force acts on the second retainer 113 and sprags 120. Therefore, this prevents breakage of the retainer and abnormal wear of the sprags.

If the second retainer 113 slips relative to the inner member 102, the first retainer 112 will not move while the amount of slip is small. But if the amount of rotation due to slip exceeds the size of the rotational-direction gaps X around the stopper pins 123 in the square holes 124, the first retainer 112 is driven by the stopper pins 123 and rotates together with the second retainer 113. In this state, since the positional relation between the first retainer 112 and the second retainer 113 is kept substantially constant, the switching function for operating the sprags remains unchanged.

Figure 23:
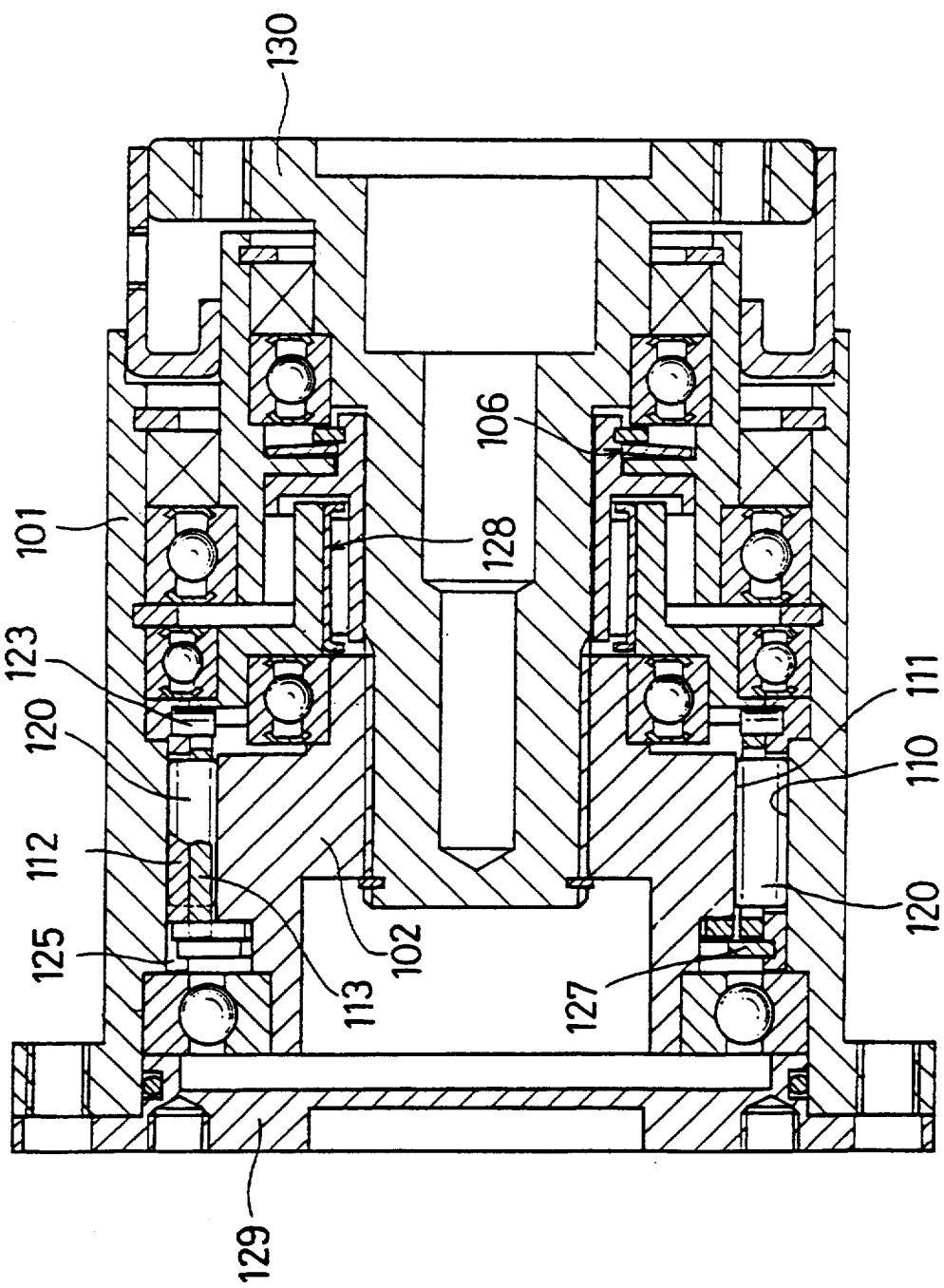
FIG. 23 is a vertical sectional front view of a fifth embodiment.
Figure 25:
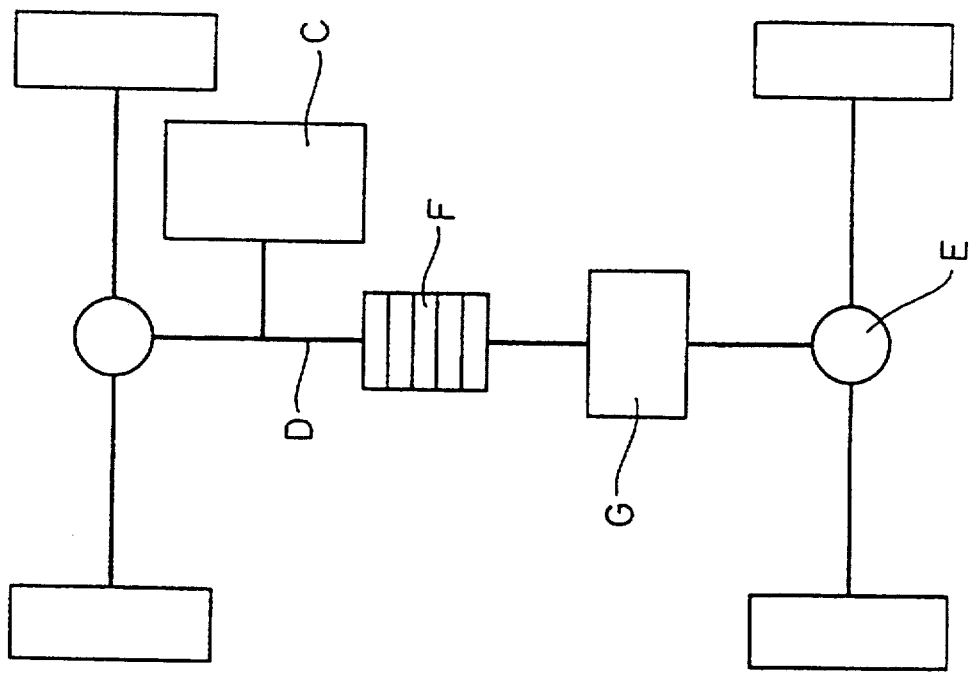
FIG. 25 is a schematic view showing a conventional drive unit of a vehicle.

FIG. 23 shows the fifth embodiment, which differs from the fourth embodiment in that the outer ring 101 is the input member and the inner member 102 is the output member. Thus, an input flange 129 is mounted to an end of the outer ring 101 and an output flange 130 to the inner member 102 through a spline.

The first retainer 112 is formed with the slit 125 and is urged by an elastic member against the inner peripheral surface of the outer ring 101. The second retainer 113 is fitted through the stopper pin 123 so as to be rotatable relative to the first retainer 112 and is biased by the switch spring 127 so as to be behind in phase with respect to the first retainer 112.

The sprags used in the fourth and fifth embodiments may be replaced with sprags adapted to engage both the cylindrical surfaces of the outer ring and the inner member only when inclined in one direction. In this case, the adjacent sprags are arranged symmetrically in opposite positions.

In the above embodiments, the rotation transmission device A was combined with a driving unit having a fluid coupling H. But its function will be the same even if it is combined with a center differential I.

Figure 24:
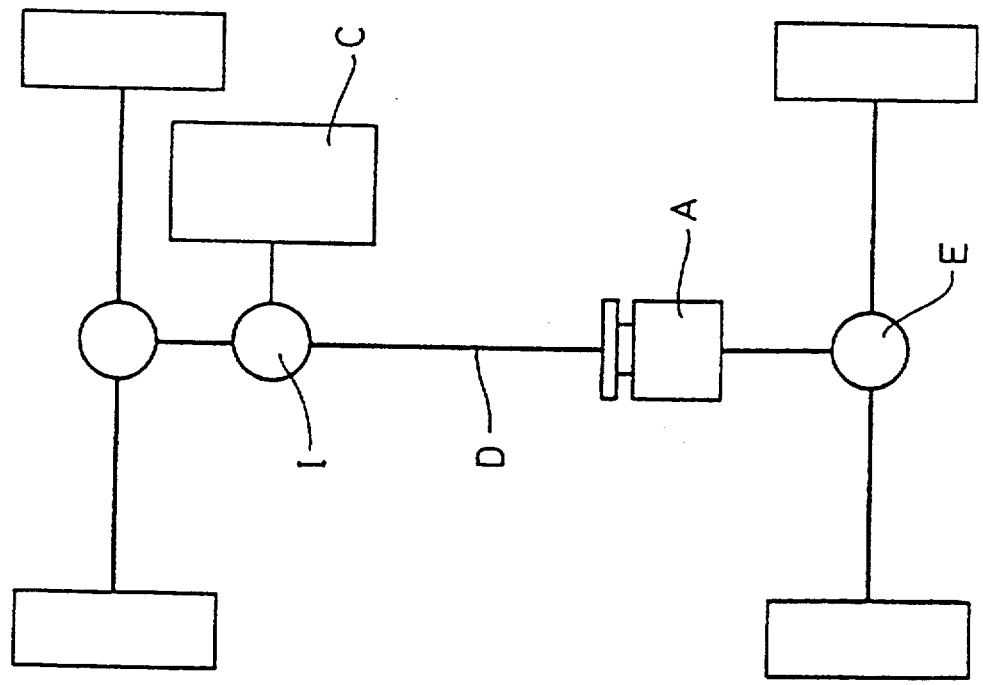
FIG. 24 is a schematic view of another arrangement of the drive unit of a vehicle.

Also, in the arrangements of FIGS. 13 and 24, its function will be the same even if the mounting positions are replaced between the limited slip differential device or the differential and the rotation transmission device, provided they are connected in series with the rear wheel propeller shaft D.

Also, in any of the above embodiments, the turning effort imparting means for creating a rotational speed difference between the retainer and the inner member or between the retainer and the outer ring is not limited to the abovesaid structure comprising a disc spring and a friction pad but may be a geared speed reducer or any other mechanism.

What is claimed is:

1. A rotation transmission device comprising a driving member, a driven member, one of said driving member and said driven member being mounted on the other so as to be rotatable relative to each other, a plurality of engaging elements disposed between said driving member and said driven member and engaging said driving member and said driven member to interlock said members together when said driving member and said driven member rotate in either direction relative to each other, a retainer member mounted between said driving member and said driven member for keeping said engaging elements spaced apart from each other at predetermined intervals, said retainer member and said driving member being coupled together so as to rotate together with each other, with a play in the circumferential direction left between the entire portion or a part of said retainer member and said driving member to allow them to rotate relative to each other, two turning effort imparting means coupled to said retainer member for imparting a turning effort to said retainer member from opposite directions, and a changeover means coupled to said retainer member for imparting the turning effort from one of said two turning effort imparting means to said retainer member while said driving member is rotating in one direction and imparting the turning effort from the other of said turning effort imparting means to said retainer member while said driving member is rotating in the opposite direction.

2. A rotation transmission device as claimed in claim 1 further comprising a differential device attached to said driving member in series with said driving member.

3. A rotation transmission device as claimed in claim 1 or 2 wherein said engaging elements are in the form of rollers, and wherein said driving member and said driven member have surfaces opposite to each other, one of said opposite surfaces being cylindrical and the other being polygonal, thereby defining a plurality of wedging spaces therebetween in which said rollers are movable to engaging positions to interlock said members together when said driving member and said driven member rotate in either direction relative to each other.

4. A rotation transmission device as claimed in claim 1 or 2 wherein said engaging elements are in the form of sprags having on both ends thereof with arcuate surfaces, and wherein said driving member and said driven member have concentric cylindrical surfaces opposite to each other, wherein said retainer member comprises a first retainer coupled to said driving member with a play left therebetween in the direction of rotation, and a second retainer carried by said driving member, said first retainer and said second retainer being formed with diametrically opposite pockets in which are received both ends of said sprags.

5. A rotation transmission device as claimed in claim 4 wherein said second retainer and said driving member are coupled together so that they will rotate relative to each other when a predetermined torque acts on said second retainer, and wherein an elastic member is provided between said first retainer and said second retainer to elastically keep the relative position between both said retainers.

6. A rotation transmission device as claimed in claim 1 further comprising a limited slip differential device attached to said driving member in series with said driving member.

* * * * *